United States Patent [19]

Smith

[11] 3,933,629

[45] Jan. 20, 1976

[54] FILTRATION

[75] Inventor: Kenneth Cecil Smith, Roydon, England

[73] Assignee: BOC International Limited, London, England

[22] Filed: June 14, 1974

[21] Appl. No.: 479,514

[30] Foreign Application Priority Data

June 14, 1973 United Kingdom............... 28327/73

[52] U.S. Cl..................... 210/17; 210/63; 210/150
[51] Int. Cl.²............................................ C02C 1/04
[58] Field of Search......... 210/150, 151, 17, 15, 63, 210/290

[56] References Cited
UNITED STATES PATENTS

| | | |
|---|---|---|
| 2,364,298 | 2/1944 | Kamp.................................. 210/150 |
| 3,126,333 | 2/1964 | Williams ............................... 210/17 |
| 3,232,434 | 2/1966 | Albersmeyer......................... 210/17 |
| 3,293,174 | 12/1966 | Robjohns............................. 210/150 |
| 3,855,120 | 12/1974 | Garbo ................................. 210/17 |

Primary Examiner—Charles N. Hart
Assistant Examiner—Benoit Castel
Attorney, Agent, or Firm—Dennison, Dennison, Meserole & Pollack

[57] ABSTRACT

An oxygenation system for promoting the activity of microorganisms supported on a filter bed, by introducing an oxygenated liquid stream into contact with the microorganisms.

7 Claims, 1 Drawing Figure

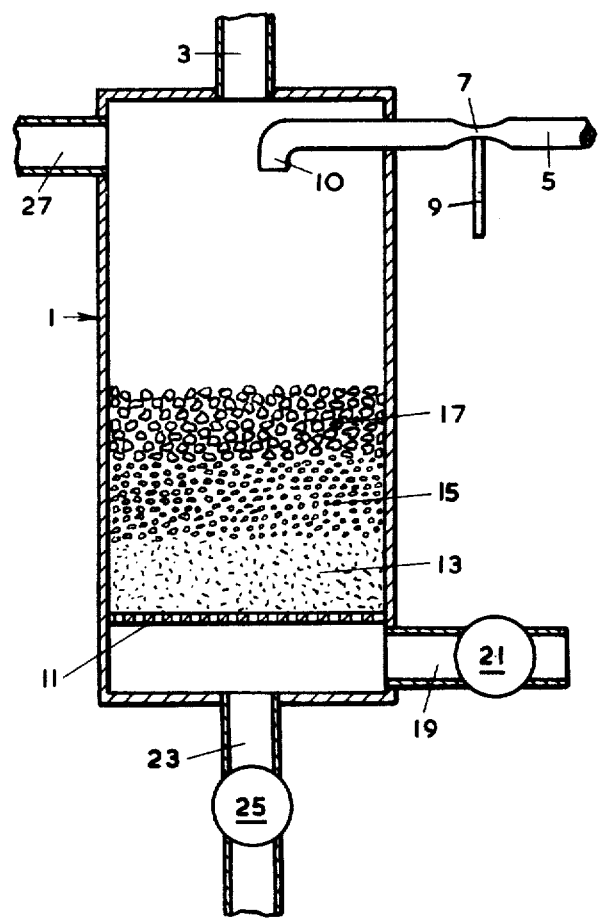

FILTRATION

FIELD OF THE INVENTION

This invention relates to making the optimum use of a biological filter.

DESCRIPTION OF THE PRIOR ART

One of the many techniques for treating aqueous effluents is to pass the effluent through a filter bed which supports micro-organisms that break down some or all of the waste material contained in the effluent stream. In general the desired activity of the micro-organisms occurs under aerobic conditions. As the filtration proceeds, however, the activity of the micro-organisms tends to use up the available oxygen in the system and to lead to anaerobic conditions which result in the formation of undesirable products such as hydrogen sulphide.

SUMMARY OF THE INVENTION

According to the invention there is provided a process for treating a filter bed in which micro-organisms are supported wherein the micro-organisms are supplied with oxygen by introducing oxygen-enriched gas into water and passing the thus oxygenated water through the filter bed.

Various types of filter bed are available for use as a biological filter. The micro-organisms can be supported on a rigid structure, for example on several layers of mesh, or on a bed of particulate material. Such beds are very useful in practice since they act both as a chemical filter and as a biological filter. An especially convenient type of particulate filter bed is the type that includes several layers of particulate material in which the smallest particles are of the most dense material and the largest particles are of the least dense material. In use, such a multiple density bed classifies itself into the requisite layer arrangement, the smallest (and densest) particles at the lowest level and the largest (least dense) particles at the uppermost level. Typical components of such a bed are polystyrene of relatively large particle size, anthracite of intermediate particle size and sand of small particle size. This mixture classifies itself into layers, in descending order, of polystyrene, anthracite and sand.

Many different strains of micro-organism can be used as the biologically active portion of the filter. If the filter is used in sewage treatment the micro-organisms are preferably bacteria of the activated sludge type. Aqueous liquid to be filtered is introduced at the top of the bed and emerges, appropriately purified, from the base. Care must be taken to keep the flow rate through the bed below the level at which a substantial proportion of the micro-organisms would be swept out of the bed.

The term "oxygen-enriched gas" is employed herein to include pure oxygen or any oxygen-containing gas with an oxygen content greater than that of air. The oxygen content of the oxygen-enriched gas is preferably greater than 90% and most preferably greater than 98%.

The oxygen-enriched gas can if desired be introduced directly into the aqueous liquid to be filtered but can alternatively be introduced into a separate aqueous stream which is then combined with the aqueous liquid to be filtered before it reaches the filter bed.

As a further possibility, the oxygenated water can be passed countercurrent to the direction of flow of liquid to be filtered. Countercurrent introduction can conveniently be combined with a stage of back flushing the filter bed to remove from it waste material from previous introduction of liquid to be filtered.

Introduction of oxygenated water into the filter bed can be conducted either intermittently or continuously. One convenient arrangement is to introduce oxygenated water and liquid to the filter bed alternately. In such a system the biological activity of the bed is restored to its upper level at the end of each filtration stage. Introduction of oxygenated water simultaneously with the introduction of liquid to be filtered ensures that the biological activity of the filter bed is maintained at a high level.

Although for most applications it is prefered to operate the filter bed at ambient temperature and ambient pressure there are instances in which the additional oxygenation obtained by employing elevated pressure makes the use of elevated pressure worthwhile.

The invention is illustrated with reference to the accompanying FIGURE.

The FIGURE shows an elevation, partly in section, of a filter unit suitable for use according to the process of the present invention.

The filter unit includes a cylindrical shell 1 disposed vertically and having at its upper end an inlet 3 for aqueous effluent material. A conduit 5 conveys water through a venturi 7 into which a stream of substantially pure oxygen is introduced through a conduit 9 leading from an oxygen cylinder (not shown). The thus-oxygenated stream enters the filter unit through an inlet 10 close to the effluent inlet 3. In the filter unit a multi-layer bed of particulate material rests on a perforated plate 11. The bed includes a lower layer 13 of sand, an intermediate layer 15 of anthracite and an upper layer 17 of polystyrene. An outlet 19 is provided for filtered liquor leaving the bed. An on/off valve 21 is provided in the outlet 19.

At the base of the filter unit there is provided an inlet conduit 23 with an associated on/off valve 25 for the introduction of water to flush the filter bed at appropriate intervals. An outlet 27 is provided in the upper part of the shell 1 for the escape of liquor with associated waste material during the back flushing operation.

A suitable strain of micro-organism, typically activated sludge, is supported on the filter bed layers 13, 15 and 17.

In a typical operation aqueous material to be filtered is introduced through the inlet 3, passes through the filter layers 17, 15 and 13 and purified material is withdrawn through the outlet 19. When the addition of a batch of material to be filtered is complete oxygenated water is introduced through the inlet 10 to restore the activated sludge to its peak condition. A second batch of material to be filtered is then introduced through the inlet 3. The sequence of effluent introduction and oxygenated water introduction is continued alternately. After a given period of such alternate operation it is usually desirable to conduct a back flush to remove accumulated waste material from the bed, this being done by closing the valve 21, opening the valve 25 and introducing clean water upwards through the bed and removing the water with any entrained waste material through the outlet 27. The valve 25 is then reclosed, the valve 21 reopened and the alternate sequence recommenced.

The apparatus illustrated in the FIGURE allows considerable flexibility in operations and can if desired be operated in sequences considerably different from the one described in detail above. For example it is possible to introduce effluent and oxygenated liquor simultaneously or to introduce effluent continuously and oxygenated liquor intermittently throughout the period of introducing effluent.

We claim:

1. A process for filtering an aqueous effluent material by introducing the effluent above a graded density filter bed wherein said bed includes layers of particulate material in which the smallest particles are of the most dense material and are at the lowest level and the largest particles are the least dense material and are at the uppermost level, and passing the same downward through the filter bed in which micro-organisms are supported wherein the micro-organisms are supplied with oxygen by substantially dissolving substantially pure oxygen gas in water to form oxygenated water and passing the thus oxygenated water downwardly through the filter bed whereby the bio-availability of oxygen to the organisms is inhanced without significant disturbance of the graded density of the filter bed thereby promoting the biological activity of the micro-organisms, and removing accumulated waste material from the filter bed by back flushing with attendant establishment of the graded density of the filter bed.

2. A process as claimed in claim 1 wherein the micro-organisms are bacteria of the activated sludge type.

3. A process as claimed in claim 1 wherein the oxygen content of the oxygen-enriched gas is greater than 90%.

4. A process as claimed in claim 3, wherein the oxygen content is greater than 98%.

5. A process as claimed in claim 1, wherein oxygenated water and aqueous effluent material to be filtered are introduced alternately into the filter bed.

6. A process as claimed in claim 1 wherein the filter bed is maintained at super-atmospheric pressure.

7. A process as claimed in claim 1 wherein the several layers of particulate material are in descending order of polystyrene, anthracite and sand, respectively.

* * * * *